(12) United States Patent
Sanchez-Cifuentes

(10) Patent No.: US 7,376,841 B2
(45) Date of Patent: May 20, 2008

(54) PORTABLE COMPUTER WITH A HAND IMPRESSION

(75) Inventor: Alvaro Sanchez-Cifuentes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/755,540

(22) Filed: Jan. 12, 2004

(65) Prior Publication Data

US 2005/0166062 A1    Jul. 28, 2005

(51) Int. Cl.
*H04L 9/00*  (2006.01)
*G06K 9/20*  (2006.01)

(52) U.S. Cl. .................. 713/186; 361/683; 382/115; 382/124; 340/5.83

(58) Field of Classification Search ............... 713/186; 361/683; 382/115, 124; 340/5.83
See application file for complete search history.

(56) References Cited

U.S. PATENT DOCUMENTS

| | | | |
|---|---|---|---|
| 5,241,488 A * | 8/1993 | Chadima et al. ............ 235/1 D |
| 5,382,962 A * | 1/1995 | Young ......................... 345/167 |
| 5,479,528 A * | 12/1995 | Speeter ........................ 382/115 |
| 5,488,575 A | 1/1996 | Danielson et al. .......... 364/707 |
| 5,745,046 A * | 4/1998 | Itsumi et al. ............... 340/5.83 |
| 6,101,086 A * | 8/2000 | Kim et al. ................... 361/683 |
| 6,337,918 B1 * | 1/2002 | Holehan ..................... 382/124 |
| 6,349,825 B1 | 2/2002 | Swinger et al. ............. 206/320 |
| 6,400,836 B2 * | 6/2002 | Senior ......................... 382/124 |
| 6,483,929 B1 * | 11/2002 | Murakami et al. .......... 382/115 |
| 2002/0081005 A1 * | 6/2002 | Black .......................... 382/124 |
| 2003/0038824 A1 * | 2/2003 | Ryder ......................... 345/684 |

FOREIGN PATENT DOCUMENTS

WO    WO 9731330 A1 *   8/1997

* cited by examiner

*Primary Examiner*—Gilberto Barron
*Assistant Examiner*—Samson Lemma
(74) *Attorney, Agent, or Firm*—Duke W. Yee; Justin M. Dillon; Cathrine K. Kinslow

(57) ABSTRACT

A portable data processing system having a chassis base unit and a chassis cover unit pivotably attached with the chassis base unit is provided. A hand impression is disposed on a bottom surface of the chassis base unit. A portable data processing system having a chassis base unit and a chassis cover unit each having a partial hand impression disposed on respective surface is provided.

13 Claims, 4 Drawing Sheets

PORTABLE COMPUTER WITH A HAND IMPRESSION

BACKGROUND OF THE INVENTION

1. Technical Field

The present invention relates generally to an improved data processing system and in particular to a portable computer having a hand impression that facilitates hand carriage of the portable computer. Still more particularly, the present invention provides a portable computer with a hand impression that facilitates proper gripping of the portable computer when hand-carrying the portable computer.

2. Description of Related Art

A portable personal computer, also commonly referred to as a laptop or notebook computer, is a battery powered mobile computer that has a size typically smaller than that of a briefcase. A typical portable computer consists of a monitor disposed in a cover pivotally attached to a base. The monitor is pivotably extended, or opened, during operation and closed during periods of non-operation or transport.

Portable computers typically cost more than a desktop personal computer having similar storage and processing capabilities due to the higher manufacturing costs associated with the portable computer. As such, various techniques have been implemented in effort to curtail damage due to physical shock, such as dropping or impact, of portable computers. For example, a typical portable computer is insulated with shock absorbing material to reduce damage to internal components when the portable computer is subjected to impact with another object.

Contemporary portable computers may easily slip from a user's grip during transport resulting in aesthetic or operational damage or destruction of the portable computer. Currently, various transport bags are used for securing portable computers when carried. A transport bag may be insulated to further reduce accidental damage to the portable computer. Whenever the portable computer is to be carried in the transport bag, the transport bag is opened, the portable computer is inserted into the transport bag, and restraining straps are extended about the portable computer and latched. However, many users find securing the portable computer in a transport bag to be unduly burdensome, a waste of time, or simply an inconvenience. Thus, often a user will carry a portable computer without securing the portable computer in a transport bag. Without securing the portable computer in the transport bag, the portable computer may slide out of the transport bag depending on the orientation of the transport bag when the bag is opened.

A user will often grip a portable computer near a peripheral edge of the chassis when carrying the portable computer in a closed configuration thus resulting in a greater likelihood of dropping the portable computer during transit. Other users will often balance a portable computer on the palm of the hand when the portable computer is deployed in an operational configuration, for example to carry the portable computer to a colleague so that the colleague may view an item displayed on the portable computer. Carriage of a portable computer in an operational configuration is particularly problematic due to the precarious balance of the portable computer on the user's hand and the user's motion that is transferred to the portable computer.

Thus, it would be advantageous to provide a portable computer with a system that facilitates proper hand carriage of a portable computer. It would be further advantageous to provide a portable computer with a system that facilitates proper positioning of the hand with respect to the portable computer when hand carrying the portable computer. It would still be further advantageous to provide a system that facilitates proper positioning of the hand when carrying the portable computer in either an operational configuration or a closed configuration.

SUMMARY OF THE INVENTION

The present invention provides a portable data processing system having a chassis base unit and a chassis cover unit pivotably attached with the chassis base unit. A hand impression is disposed on a bottom surface of the chassis base unit. Additionally, a portable data processing system is provided having a chassis base unit and a chassis cover unit each having a respective surface with a partial hand impression disposed thereon.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiments of the present invention and its advantages are best understood by referring to FIGS. 1 through 4D of the drawings, like numerals being used for like and corresponding parts of the various drawings.

Figure 1:
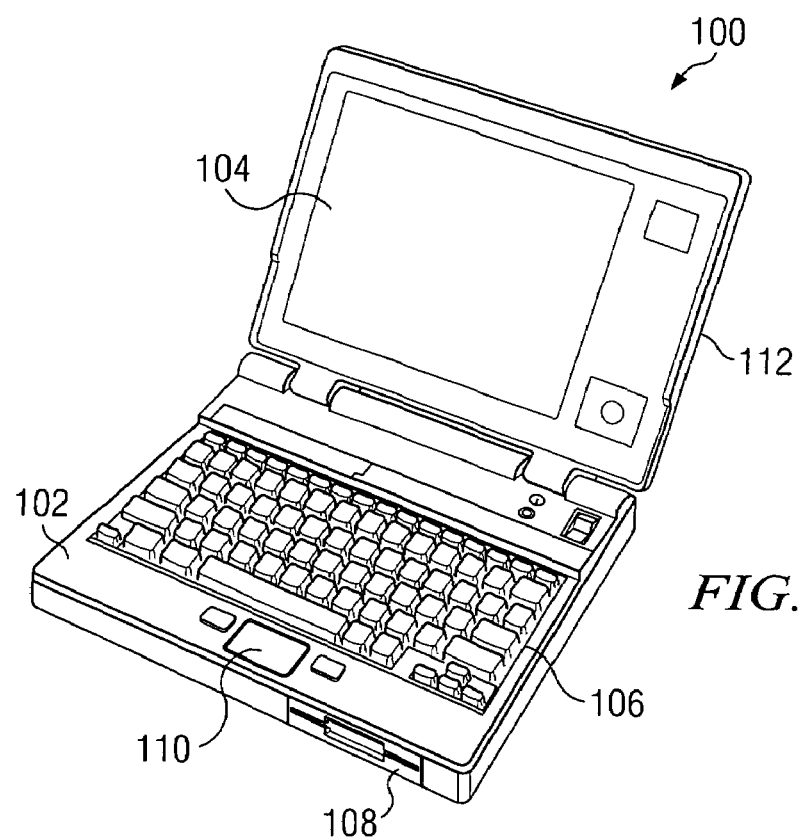
FIG. 1 a pictorial representation of a data processing system in which the present invention may be implemented in accordance with a preferred embodiment of the present invention

With reference now to FIG. 1, a pictorial representation of a data processing system in which the present invention may be implemented is depicted in accordance with a preferred embodiment of the present invention. A portable, or laptop, computer 100 is depicted which includes chassis base unit 102, video display terminal 104 disposed within a chassis cover unit 112, keyboard 106, storage devices 108, which may include floppy drives and other types of permanent and removable storage media, and pointer device 110. Additional input devices may be included with portable computer 100, such as, for example, a mouse, joystick, touch screen, trackball, microphone, and the like. Chassis cover unit 112 is pivotably attached to chassis base unit 102 by a hinge or other pivotable fastener. Portable computer 100 may be implemented using any suitable computer, such as an IBM Thinkpad computer, which is a product of International Business Machines Corporation, located in Armonk, N.Y. Portable computer 100 is shown in FIG. 1 in an operational configuration, that is with chassis cover unit 112 extended, or opened.

Figure 2:
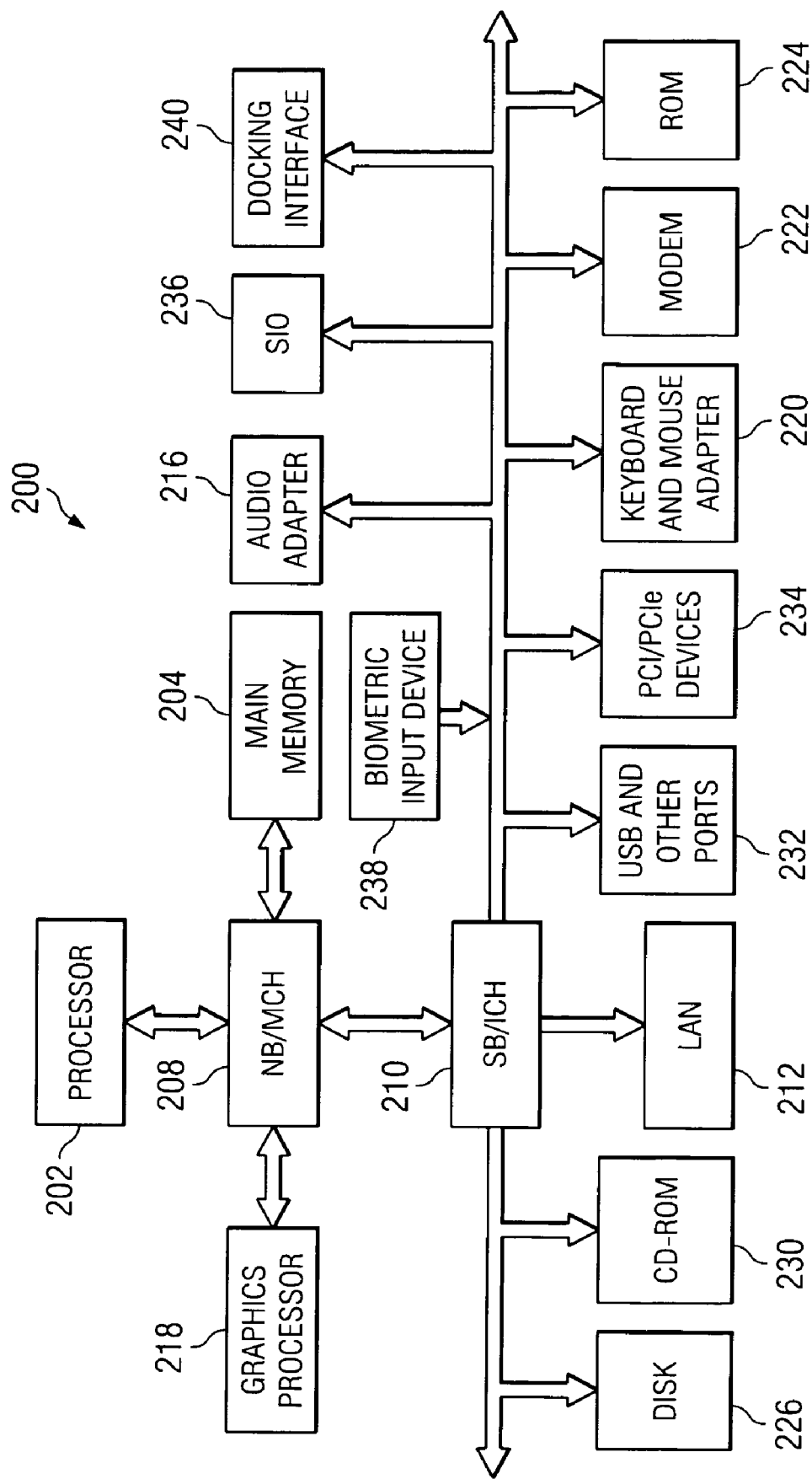
FIG. 2 is a block diagram of a data processing system in which the present invention may be implemented.

With reference now to FIG. 2, a block diagram of a data processing system is shown in which the present invention may be implemented. Data processing system 200 is an example of a portable computer, such as computer 100 in FIG. 1, in which code or instructions may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210. Biometric input device 238 may be connected to ICH 210 that generates biometric data responsive to user contact with biometric input device 238.

Docking interface 240 may also be connected to the ICH. Docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash memory, equivalent nonvolatile memory, or optical disk drives and the like, may be used in addition to or in place of the hardware depicted in FIG. 2.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer in addition to taking the form of a PDA.

Figure 3A:
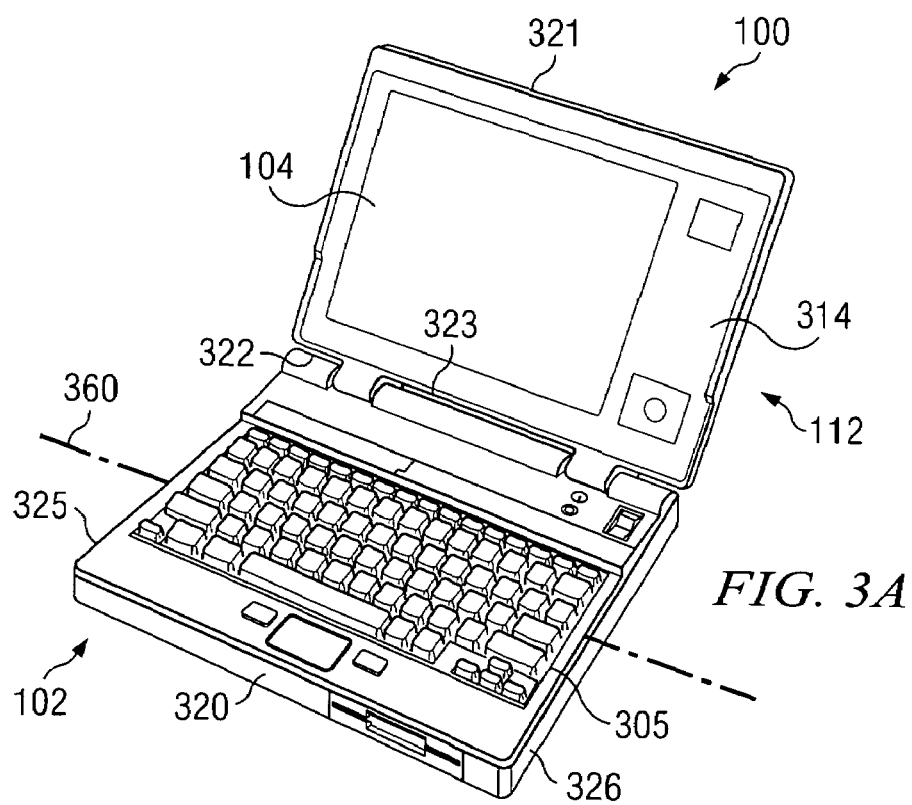
FIG. 3A is a diagrammatic perspective illustration of a portable computer in an operational configuration in accordance with a preferred embodiment of the present invention.

FIG. 3A is a diagrammatic perspective illustration of portable computer 100 in an operational configuration. Chassis cover unit 112 is extended, or opened, from chassis base unit 102 in the operational configuration and top surface 305 of chassis base unit 102 and bottom surface 314 of chassis cover unit 112 are exposed to the user. Chassis cover unit 112 is hingedly fastened to chassis base unit 102 along posterior edge 322 of chassis base unit 102 and posterior edge 323 of chassis cover unit 112. Posterior edge 322 extends the length of chassis base unit 102 and is generally parallel with chassis base unit longitudinal medial axis 360. Posterior edge 323 of chassis cover unit 112 extends the length of chassis cover unit 112 and is generally parallel with chassis cover unit longitudinal medial axis 330.

Figure 3B:
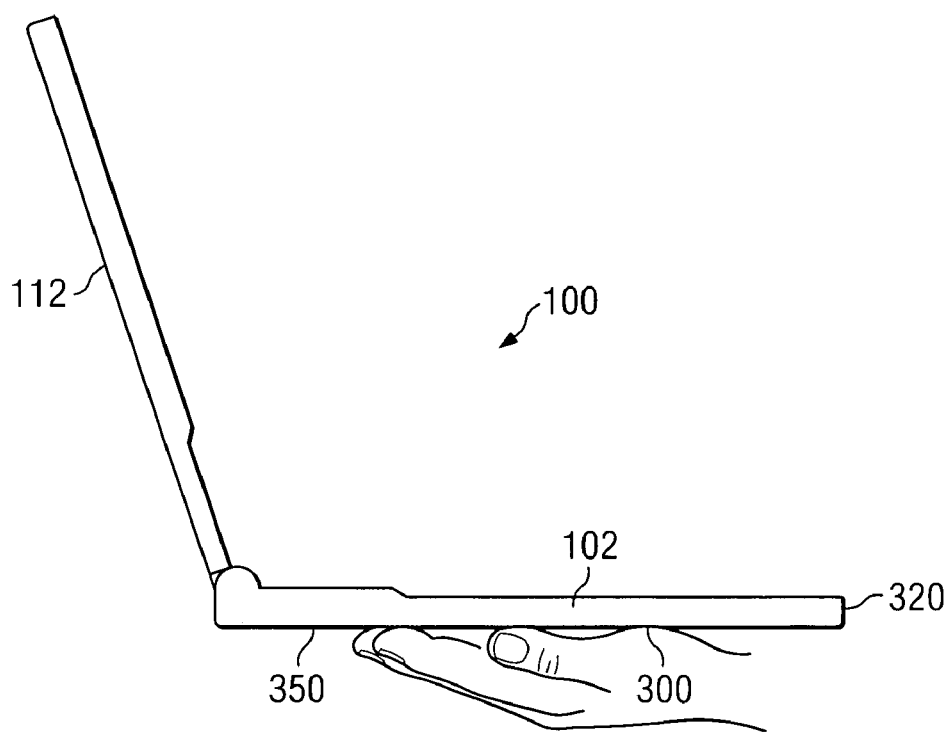
FIG. 3B is a diagrammatic illustration of the portable computer of FIG. 3A in the operational configuration being transported by balancing the portable computer on a user's hand.

When portable computer 100 is placed in the operational configuration, a user is typically situated most proximate anterior edge 320 of chassis base unit 102 and faces video display terminal 104 that is disposed on bottom surface 314 of chassis cover unit 112. Likewise, when the user transports portable computer 100 in an operational configuration, the user typically places a hand on a bottom surface of chassis base unit 102 with anterior edge 320 nearest the user's body. For example, FIG. 3B is a diagrammatic illustration of portable computer 100 in the operational configuration being transported by balancing portable computer 100 on user's hand 300. To provide the most stable balance of portable computer 100 on hand 300, the fingers of the hand should be fully extended.

Figure 3C:
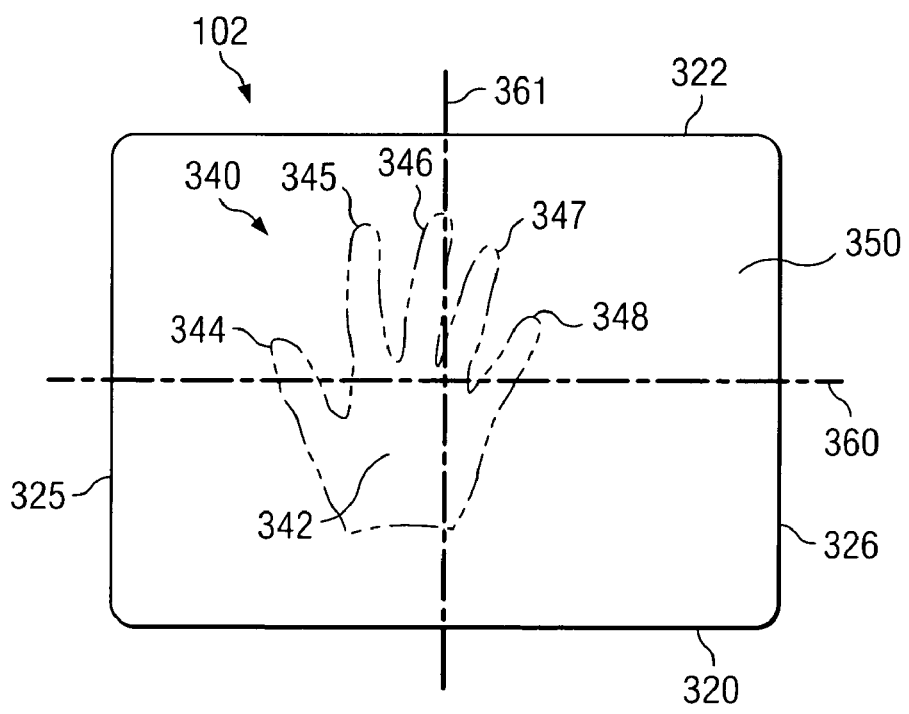
FIG. 3C is a diagrammatic illustration of a bottom surface of a chassis base unit of the portable computer described with reference to FIG. 3A in accordance with a preferred embodiment of the present invention.

In accordance with a preferred embodiment of the present invention, hand impression 340 is disposed on bottom surface 350 of chassis base unit 102 as shown by the diagrammatic illustration of chassis base unit bottom surface 350 in FIG. 3C. In the illustrative example, hand impression 340 is designated with dashed lines. Hand impression facilitates placement of hand 300 within the boundaries of hand impression 340. Hand impression 340 may consist of a hand-shaped recess fabricated in bottom surface 350. That is, chassis base unit 102 and hand impression 340 may be implemented as a monolithic structure. Alternatively, hand impression 340 may be implemented as a hand-shaped element adhered to bottom surface 350.

In the preferred embodiment of the present invention, hand impression 340 consists of a hand imprint fabricated into bottom surface 350 of chassis base unit 102. Hand impression 340 preferably comprises a palm impression 342 having finger impressions 344-348 each respectively conjoined with palm impression 342. Finger impressions 344-348 are elongate imprints extending from palm impression 342 and are generally staggered to facilitate a satisfactory hand extension.

Preferably, hand impression 340 is positioned on bottom surface 350 such that placement of hand 300 within hand impression 340 is had with anterior edge 322 most proximate the user's body. Accordingly, distal ends of finger impressions 344-348 are located more proximate posterior edge 322 than respective proximal ends of finger impressions 344-348 that conjoin finger impressions 344-348 with palm impression 342. Moreover, it is preferable that hand impression 340 is disposed intermediate lateral edges 325 and 326 of chassis base unit 102 such that the intersection of longitudinal medial axis 360 and lateral medial axis 361 of chassis base unit 102 lies within an imaginary orthogonal projection extending from the boundaries of palm impression 342.

Figure 4A:
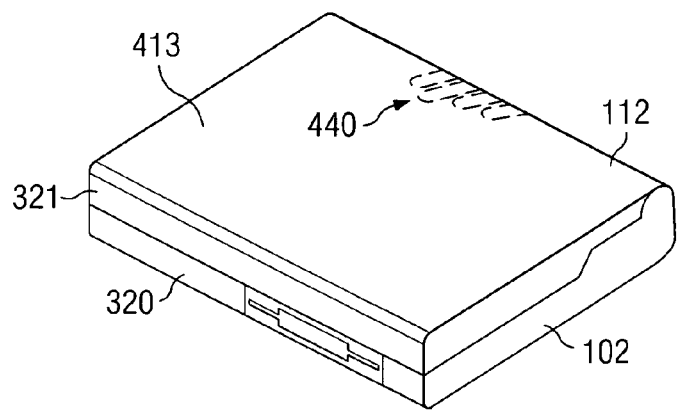
FIG. 4A is a diagrammatic perspective illustration of a portable computer in a closed configuration in accordance with a preferred embodiment of the present invention.
Figure 4B:
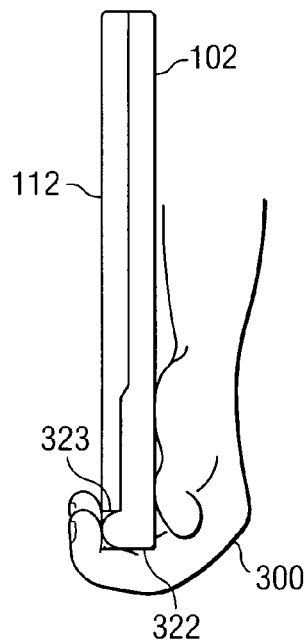
FIG. 4B is a diagrammatic illustration of the portable computer of FIG. 4A being carried by a user in accordance with a preferred embodiment of the present invention.

FIG. 4A is a diagrammatic perspective illustration of portable computer 100 in a closed configuration in accordance with a preferred embodiment of the present invention. Portable computer 100 is closed by pivotably rotating chassis cover unit 112 such that anterior edge 321 of chassis cover unit 112 is brought into abutment with anterior edge 320 of chassis base unit 102. Bottom surface 314 of chassis cover unit 112 is adjacent top surface 305 shown in FIG. 3A of chassis base unit 102 when portable computer 100 is placed in the closed configuration. When portable computer 100 is placed in the closed configuration and hand carried, the user typically closes hand 300 and grasps both chassis base unit 102 and chassis cover unit 112 with the hand as shown by the diagrammatic illustration of portable computer 100 in FIG. 4B. Typically, the user carries portable computer 100 with posterior edge 322 of chassis base unit 102 and posterior edge 323 of chassis cover unit 112 resting against the palm of hand 300 such that top surface 413 of chassis cover unit 112 faces the user.

Figure 4C:
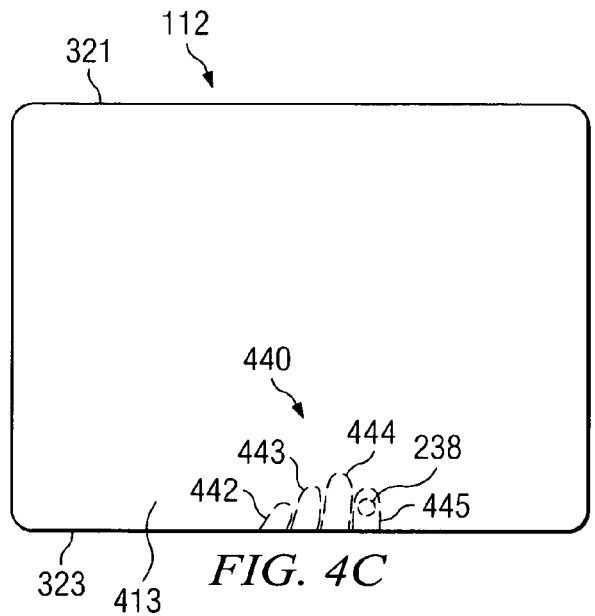
FIG. 4C is a diagrammatic illustration of a top surface of a chassis cover unit of the portable computer shown in FIGS. 4A and 4B in accordance with a preferred embodiment of the present invention.

In accordance with a preferred embodiment of the present invention, a partial hand impression is included on each of chassis base unit 102 and chassis cover unit 112. FIG. 4C is a diagrammatic illustration of top surface 413 of chassis cover unit 112 in accordance with a preferred embodiment of the present invention. Partial hand impression 440 is disposed on top surface 413 of chassis cover unit 112 and facilitates proper hand positioning when carrying portable computer 100 in the closed configuration. Partial hand impression 440 may consist of a partial hand-shaped recess, or imprint, monolithically fabricated in top surface 413 of chassis cover unit 112. Alternatively, partial hand impression 440 may be implemented as one or more elements adhered to top surface 413.

In the illustrative example, partial hand impression 440 comprises four partial finger impressions 442-445. Partial finger impressions 442-445 extend from posterior edge 323 of chassis cover unit 112 and consist of elongate imprints, or recesses, fabricated in top surface 113 of chassis cover unit 112.

Figure 4D:
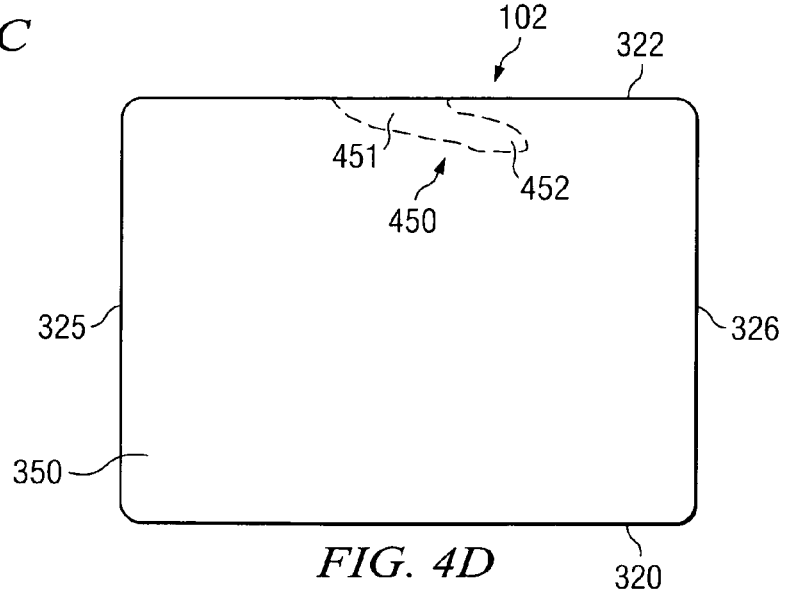
FIG. 4D is a diagrammatic illustration of a bottom surface of a chassis base unit of the portable computer shown and described with reference to FIGS. 4A-4C in accordance with a preferred embodiment of the present invention.

FIG. 4D is a diagrammatic illustration of bottom surface 350 of chassis base unit 102 in accordance with a preferred embodiment of the present invention. Partial hand impression 450 is disposed on bottom surface 350 of chassis base unit 102. Partial hand impression 450 comprises a partial palm impression 451 with conjoined thumb impression 452 extending from palm impression 451. Partial hand impression 450 extends from posterior edge 322 of chassis base unit 102. Partial hand impression 450 is monolithically fabricated as an imprint, or recess, in bottom surface 350 of chassis base unit 102 and facilitates proper positioning of a user's hand when carrying portable computer 100 in the closed configuration. Alternatively, partial hand impression 450 may be implemented as an element adhered to bottom surface 350. Of course, partial hand impression 440 and partial hand impression 450 may be interchangeably disposed on bottom surface 350 of chassis base unit 102 and top surface 413 of chassis cover unit 112, respectively.

When portable computer 100 is placed in the closed configuration for hand carriage, partial hand impressions 440 and 450 allow the user to securely grip portable computer 100 with posterior edges 322 and 323 of chassis base unit 102 and chassis cover unit 112 resting against a portion of the user's palm or fingers. The user's thumb and part of the palm are positioned within partial hand impression 450 of chassis base unit 102 and portions of the user's fingers are positioned within partial hand impression 440.

Additionally, various portable computers may have hand impressions of different sizes disposed on chassis surfaces of the portable computers. The hand impressions may, for example, be customized to a particular user's hand size. Alternatively, chassis of portable computers may be fabricated with different hand impression sizes such that consumers can select among the various hand impression sizes of the different portable computers.

In accordance with yet another embodiment of the present invention, one or more of hand impression 340, partial hand impression 440, and partial hand impression 450 may include a biometric sensor to facilitate enablement or disablement of portable computer 100. For example, biometric input device 370 that samples biometric data of a user when contacted with a user's finger may be integrated within partial hand impression 440. In the illustrative example, biometric input device 238 is disposed at a distal end of partial finger impression 445.

Biometric input device 238 may be implemented as, for example, a finger print scanner that samples a user's finger print positioned within partial finger impression 445. Alternatively, biometric input device 238 may be implemented as a surface shape sensor. For example, biometric input device 238 may be implemented as a plurality of contact electrodes that generate biometric data responsive to contact with a user's finger. Finger print scanner and shape sensor verification sensors are well known and any one of various commercially available biometric verification systems may be employed as biometric input device 238 to disable portable computer 100 when a determination that biometric data of a non-authorized user has been sampled by biometric input device 238.

A biometric verification algorithm is preferably executed by portable computer 100. The verification algorithm may be integrated with the system BIOS and stored in ROM 224 of FIG. 2. Biometric input device 238 generates biometric data from a user when the user's finger is pressed against biometric input device 238 and communicates the generated biometric data to processor 202. Processor 202 executes the biometric verification algorithm and an analysis of the biometric data generated by biometric input device 238 is performed responsive to execution of the biometric verification algorithm. The biometric verification algorithm preferably includes a fingerprint data memory that stores one or more fingerprints of authorized users. The fingerprint data memory may be maintained with the system BIOS in ROM 224.

A comparison of the biometric data generated by biometric input device 238 is made with the fingerprints stored in the fingerprint data memory and data processing system 200 is disabled if a match between the biometric data generated by biometric input device 238 is not made. While biometric input device 238 is shown and described as integrated with partial hand impression 440, biometric input device 238 may alternatively be disposed within hand impression 340 or partial hand impression 450. Additionally, multiple biometric input devices may be deployed within one or more of hand impression 340, partial hand impression 440 and partial hand impression 450.

As described, the present invention provides a portable computer with a hand impression that facilitates proper placement of a hand when carrying the portable computer in an operational configuration. Placement of the hand impression on a chassis base unit of the portable computer is made such that a desirable balance of the portable computer on the user's hand is had. Additionally, a portable computer with partial hand impressions on both a chassis base unit and chassis cover unit is provided such that proper hand placement is facilitated when carrying the portable computer in a closed configuration. Thus, a firm grip and a balanced position of the portable computer within the user's hand is had and the likelihood of damage due to dropping the portable computer is advantageously reduced.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A portable data processing system, comprising:
    a chassis base unit with a hand impression disposed on a bottom surface of the chassis base unit, wherein the chassis base unit and the hand impression are part of a monolithic structure, and wherein the bottom surface of the chassis base unit is substantially flat;
    a chassis cover unit pivotably fastened to the chassis base unit; and
    a sensor disposed in the hand impression, responsive to contact by a user, for enabling or disabling a processing unit in the data processing system;
    wherein an intersection of a medial lateral axis of the chassis base unit and a medial longitudinal axis of the chassis base unit is within an orthogonal projection of the hand impression extending from a border of the hand impression;
    wherein the hand impression further includes a hand shaped imprint disposed on the bottom surface of the chassis base unit; and
    wherein the hand impression comprises a palm impression and five conjoined finger impressions extending from the calm impression.

2. The portable data processing system of claim 1, wherein distal ends of the five conjoined finger impressions are more proximate to a posterior edge of the chassis base unit than the palm impression.

3. The portable data processing system of claim 1, wherein the palm impression is more proximate to an anterior edge of the chassis base unit than the five conjoined finger impressions.

4. The portable data processing system of claim 1, wherein the hand impression is fastened to the chassis base unit.

5. The portable data processing system of claim 1, further comprising:
    a memory that contains a set of instructions and a fingerprint data memory;
    a biometric input device disposed in the hand impression, responsive to contact by a user, for generating biometric data; and
    a processing unit, responsive to execution of the set of instructions, for disabling the data processing system upon determination that the biometric data does not match data stored in the fingerprint data memory.

6. A portable data processing system, comprising:
    a chassis base unit having a first partial hand impression disposed on a bottom surface of the chassis base unit, wherein the chassis base unit and the first partial hand impression are part of a monolithic structure, and wherein the bottom surface of the chassis base unit is substantially flat;
    wherein an intersection of a medial lateral axis of the chassis base unit and a medial longitudinal axis of the chassis base unit is within an orthogonal projection of the hand impression extending from a border of the hand impression; wherein the hand impression further includes a hand shared imprint disposed on the bottom surface of the chassis base unit; and wherein the hand impression comprises a palm impression and five conjoined finger impressions extending from the calm impression;
    a chassis cover unit pivotably attached to the chassis base unit, wherein the chassis cover unit has a second partial hand impression disposed on a top surface of the chassis cover unit, wherein the chassis cover unit and the second partial hand impression are part of a monolithic structure, and wherein the bottom surface of the chassis base unit is substantially flat; and
    a sensor disposed in at least one of the first partial hand impression or second partial hand impression, responsive to contact by a user, for enabling or disabling a processing unit in the data processing system.

7. The portable data processing system of claim 6, wherein the first partial hand impression comprises a partial palm impression and a thumb impression.

8. The portable data processing system of claim 6, wherein the second partial hand impression comprises a plurality of partial finger impressions.

9. The portable data processing system of claim 6, wherein the first partial hand impression extends from a posterior edge of the chassis base unit.

10. The portable data processing system of claim 6, wherein the second partial hand impression extends from a posterior edge of the chassis cover unit.

11. The portable data processing system of claim 6, wherein the first partial hand impression is adhered to the bottom surface, and the second partial hand impression is adhered to the top surface.

12. The portable data processing system of claim 6, further comprising:
    a memory that contains a set of instructions and a fingerprint data memory;
    a biometric input device disposed in one of the first partial hand impression and the second partial hand impression, responsive to contact by a user, for generating biometric data; and
    a processing unit, responsive to execution of the set of instructions, for disabling the data processing system upon determination that the biometric data does not match data stored in the fingerprint data memory.

13. The portable data processing system of claim 12, wherein the second partial hand impression comprises a plurality of partial finger impressions, and the biometric input device is disposed on a distal end of one of the plurality of partial finger impressions.

* * * * *